Feb. 2, 1971  E. M. KNAPP ET AL  3,560,347
APPARATUS FOR CARBONIZING CARBONACEOUS MATERIALS
USING MICROWAVE ENERGY
Original Filed Aug. 4, 1964  4 Sheets-Sheet 1

INVENTORS
EDWARD M. KNAPP,
WELDON T. ELLIS,
BY
ATTORNEYS.

FIG. 3.

INVENTORS
EDWARD M. KNAPP,
WELDON T. ELLIS,
BY
Linton and Linton
ATTORNEYS.

Feb. 2, 1971  E. M. KNAPP ET AL  3,560,347
APPARATUS FOR CARBONIZING CARBONACEOUS MATERIALS
USING MICROWAVE ENERGY
Original Filed Aug. 4, 1964  4 Sheets-Sheet 3
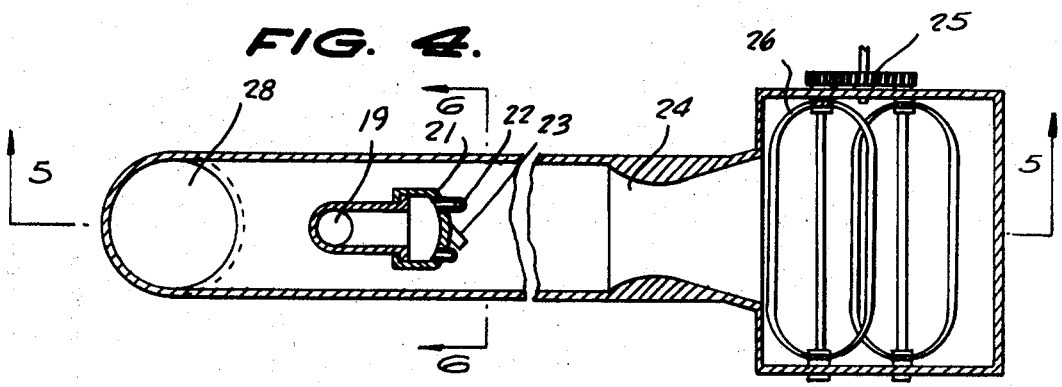
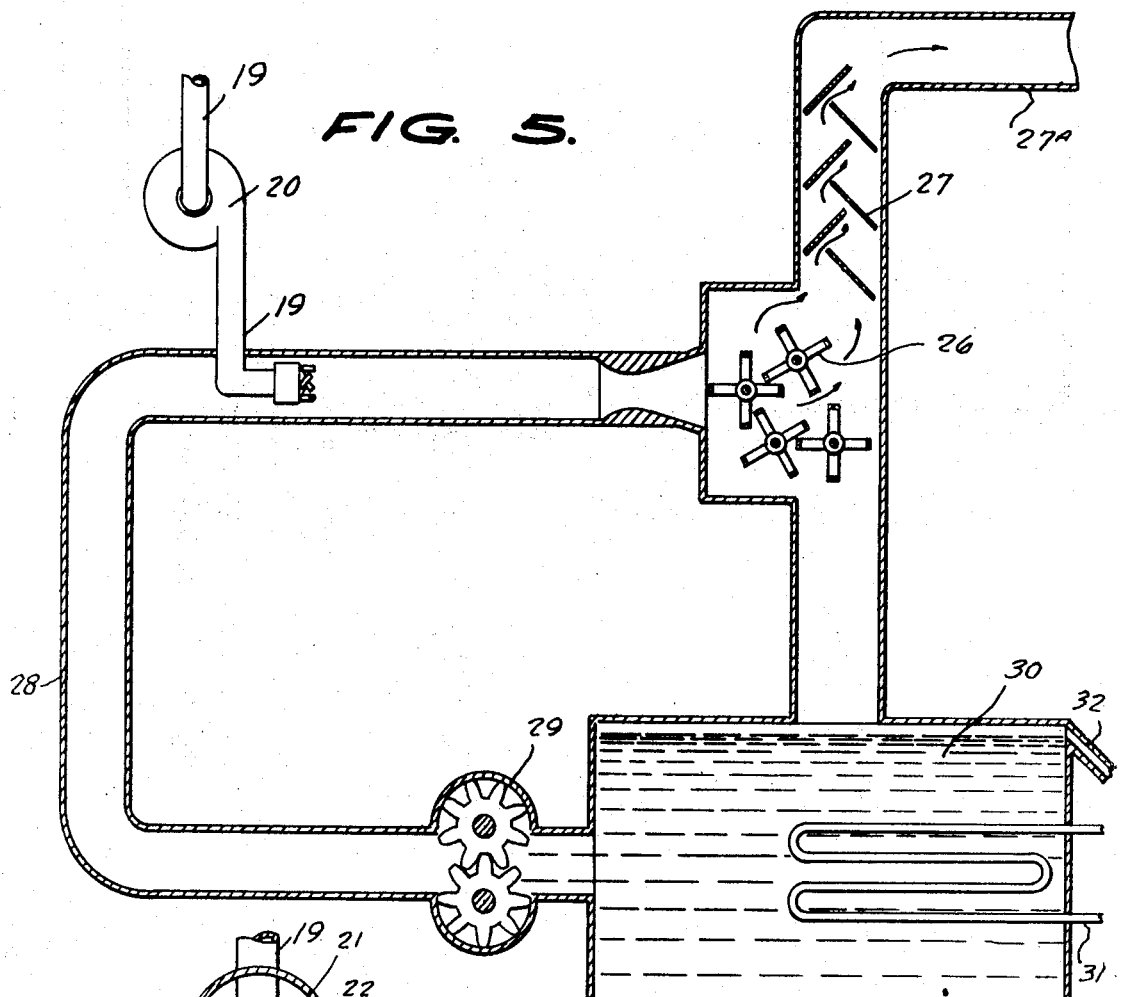
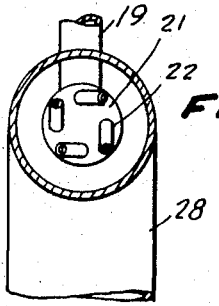
INVENTORS
EDWARD M. KNAPP,
WELDON T. ELLIS,
BY
Linton and Linton
ATTORNEYS.

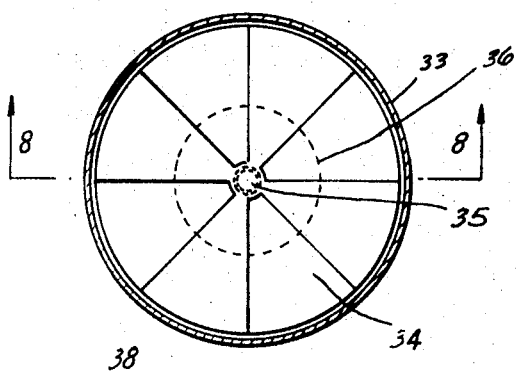
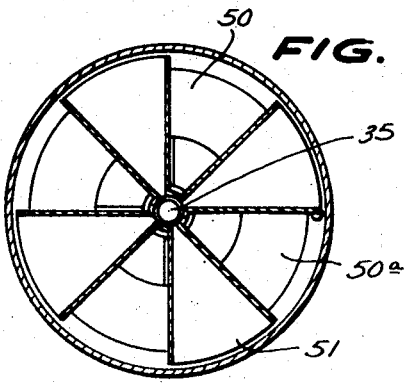
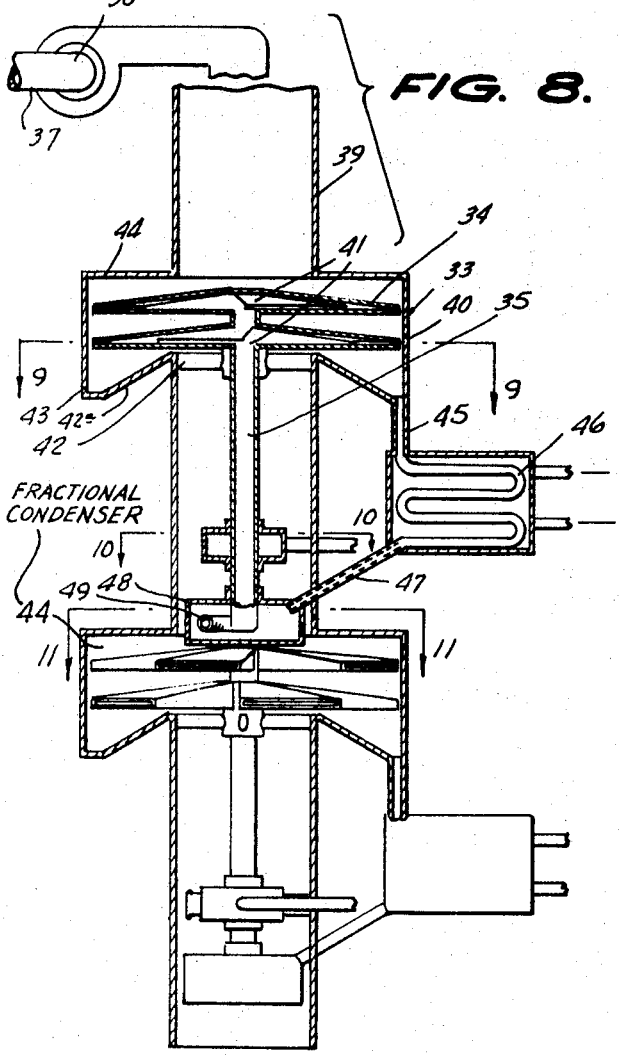
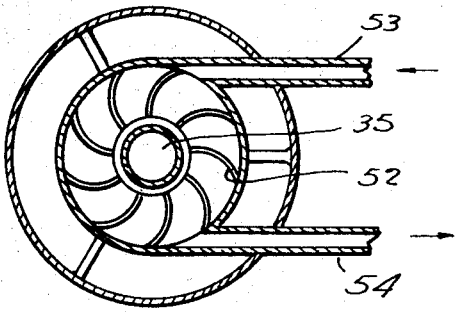
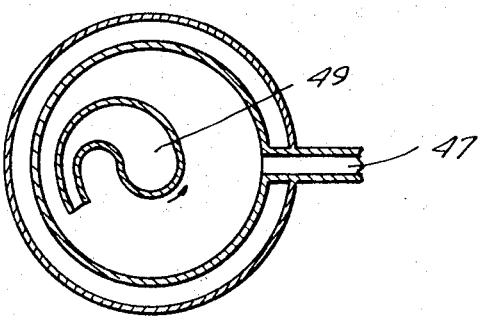

United States Patent Office 3,560,347
Patented Feb. 2, 1971

3,560,347
APPARATUS FOR CARBONIZING CARBONACEOUS MATERIALS USING MICROWAVE ENERGY
Edward M. Knapp, 951 N. Livingston St., Arlington, Va. 22205, and Weldon T. Ellis, Royal Arms Apts. S-11, 2011 Richard Jones Road, Nashville, Tenn. 37215
Original application Aug. 4, 1964, Ser. No. 387,453, now Patent No. 3,449,213, dated June 10, 1969. Divided and this appplication June 2, 1969, Ser. No. 829,538
Int. Cl. C10b 7/06
U.S. Cl. 202—108                                       3 Claims

ABSTRACT OF THE DISCLOSURE

Coal is first preheated in a first chamber by direct contact with hot gases and is then carbonized in a second chamber using microwave energy as the heat source. The volatile material from the second chamber is fractionally condensed.

---

Figure 2:
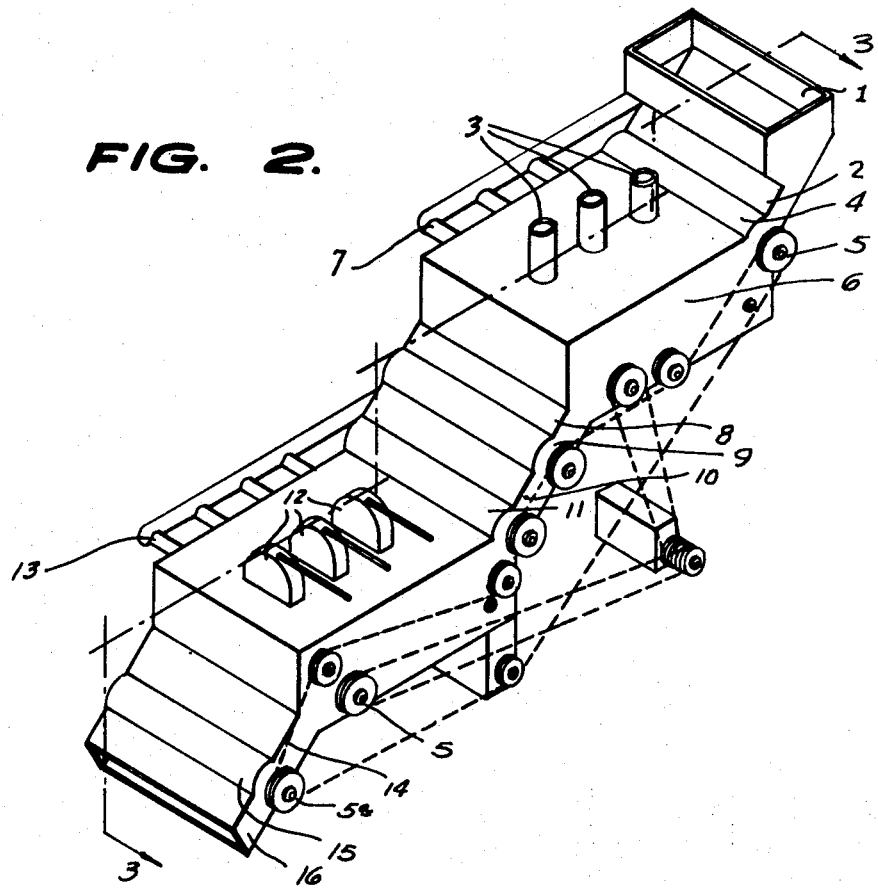

This is a division of application Ser. No. 387,453, filed Aug. 4, 1964, now Patent No. 3,449,213, issued June 10, 1969.

This invention relates to the recovery of sophisticated volatile materials extracted by heat from carbonaceous materials, specifically bituminous coals of all grades. Such chemicals have heretofore been produced largely by synthesis from basic hydrocarbons produced from coal by the application of extreme heat. The present invention differs from the prior art in at least two ways—(1) The materials are produced by the application of moderate and quite controlled heat, and (2) the materials are obtained by direct condensation from the vapor state of a mixture of primary compounds extracted from the coal.

One object of the invention is the recovery as liquids of useful chemicals which are released from the coal by the application of heat. A second object of the invention is the providing of means to accomplish this recovery by direct differential condensation from a mixture of compounds in the vapor state without first reducing the mixture of compounds to a complex liquid and then redistilling it. Another object of the invention is to recover said chemicals with a minimum of contamination.

Another object of the invention is to extract these chemicals in the vapor state at a minimum temperature so that the temperature to which the chemicals are subjected is not sufficient to induce secondary reactions, such as polymerization, severe condensation reactions, saturation of unsaturate compounds, and severe cracking. These reactions produce materials having molecular weights either too high or too low to permit extensive commercial use of such materials. Such products are tars.

Basic to any consideration of the products to be recovered from coal is the structure of the coal which is treated. In the course of the natural formation of coal, its vegetative components are transformed from the aliphatic structures, such as cellulose, into aromatic ring structures, which tend to arrange themselves in successive layers of such ring structures in mosaic alignment. An analogy would be a number of tile floors, one on top of another, each one very slightly beaten up so that the chips make the various tile layers tie into the adjoining layer. In the present invention, these structures are hit with heat at the minimum temperature sufficient to separate the tiles from each other, but not to reduce the whole mass to chips and dust. The heart of the invention resides in the procedures and apparatus invented to recover and separate substantially intact chemical structures. Extending the analogy, the prior art reduces the entire series of tile floors to dust and then uses the dust to put back together again the tiles which were originally in the floor. Here we want to recover usable tiles with minimum breakup.

This process then consists of (1) the means of applying controlled and restricted heat, restricted both in the amount of heat and in temperature, to the coal for the purpose of breaking some of the bonds present, but not to destroy the material entirely, (2) the recovery of these materials as they are separated from the coal structure. We, therefore, direct your attention to FIG. 1 of the attached drawings. It is essentially a flow chart relating items of equipment. In this figure, parts of the apparatus are designated by name, rather than by number, and a statement of these units and their relationship to the process will show the intended process. Carbonaceous material is introduced through the hopper to a pro-carbonizer, where it is heated to about 600° F. temperature, a very low temperature in the art, by the passage of hot gas through it. This degree of heating drives out those hydrocarbons which have very low molecular weight (fixed gases) and which would not have commercial use. The solid material still containing the chemicals of commerce passes to a carbonizer where it is subjected to microwave heating, which will bring it to a controlled temperature of about 800° F. The use of microwave heat brings up the temperature in a uniform manner and obviates the need of applying temperature or heat in excess of that required to bring out the chemicals. The microwave power unit is not a part of this invention and is shown here only for descriptive purposes. Microwave equipment as such is the province of the companies producing microwave equipment.

From the carbonizer, two flows of material are shown. The first is the char, or semi-coke (a residual solid), which is eliminated as a by-product. The second flow is the flow in the vapor state of all the chemicals released from the coal. This includes not only those of commercial value, but also those with higher molecular weights, which would have little commercial value. The purpose of the massive quench is to separate this comingled group of chemicals in the vapor state into two groups—(1) those chemicals having boiling points higher than the break point temperature at which the massive quench is maintained, and (2) those chemicals of commercial importance which would have boiling points lower than the break point temperature of the massive quench. Again, the extremely high molecular weight materials of no commercial value are eliminated, but the materials of commercial importance move in the vapor state to a vapor fractionator, which reduces them to liquid chemicals for sale.

Figure 1:
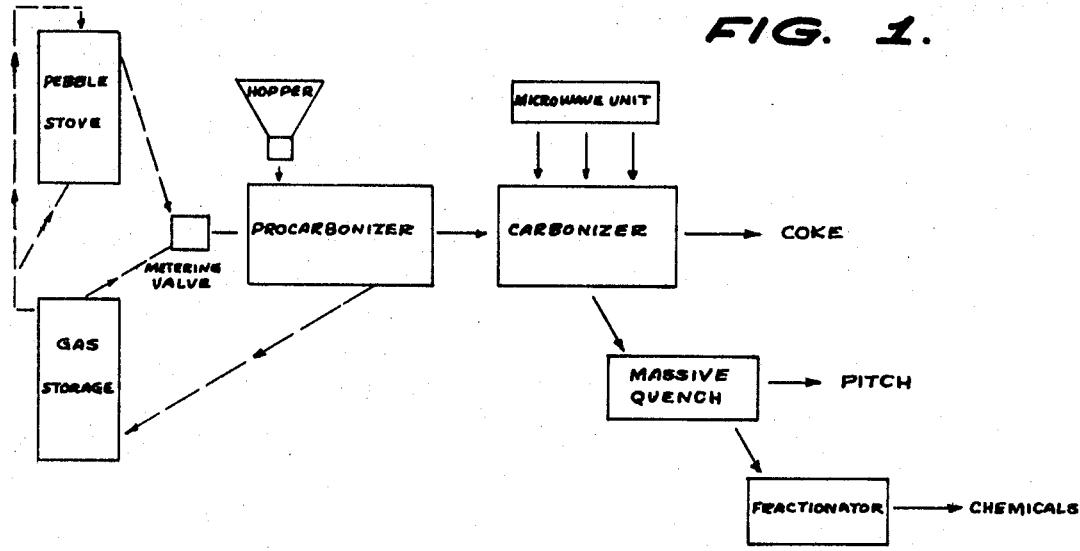

Turning to the other end of FIG. 1 (flow chart diagram), there is noted a pebble above gas storage, and a metering mixing valve. The pebble stove is a device for the heating of gases to controlled temperatures at high efficiency. The temperatures obtained are extremely high and these high temperature gases can be mixed with gases of much lower temperature so that the gas passing through the metering valve into the pro-carbonizer can be maintained at a predetermined intermediate temperature. These three items are all in the prior art, are not now patent covered, and are shown here only for purposes of full explanation. Detailed description of the other drawings, FIGS. 2 through 11, will be deferred at this point until after further discussion of the invention.

In the prior art, three methods have been used to introduce heat into a mass of carbonaceous materials, such as coal. These methods are:

(1) The passage of heated products of combustion or similar heated gaseous media, through flues in the walls of an oven into which the carbonaceous material has been placed. The walls are heated, which then transfer the heat to the coal in accordance with the laws governing heat transfer between solids.

(2) Heated gases of two types—either the products of combustion, or heated gases of other non-oxygen bearing character—are passed through the mass of carbonaceous material, arranged in sized lumps, thereby heating the surface of each lump separately as though that surface were a hot wall.

(3) Carbonaceous materials in the form of fines, as distinct from the terminology used in the trade of sized lumps, are conveyed through a chamber by the flow of a large volume of heated gases moved at high velocity to accomplish at one and the same time the work of carrying the carbonaceous material through the apparatus and transfering heat to it. This last form of the carbonization process is commonly known as fluidized.

It will be obvious to those skilled in the art that in the first of the three prior methods stated, the general laws governing the transfer of heat as they apply to coal limit the application of heat. It has been found that to produce the complete carbonization of the coal charge at 800° F., the hot body, whether wall or gas, must have a temperature of at least 1200° F. to produce temperature gradients within each piece of coal sufficient to drive the heat to the center of the charge and to extract useful chemicals. Since the volatile materials released from the coal then come into contact with these high temperatures in the environment, secondary reactions are precipitated and instead of the primary decomposition products of coal the products recovered are either very simple aromatic compounds, or tars. In the prior art, low temperature carbonization operations used a temperature of 1200° F., and coking operations have used temperatures in the neighborhood of 1800° F.

It will be noted that the first step in the present invention does use a method of carbonization with some similarity to the second method listed above as being in the prior art. Hot gas is passed through the coal, but the present invention differs from the prior art in using hot gas only in the first stage and to a temperature which does not accomplish the purpose of the prior art which does not stop with this temperature and instead uses the hot gas to complete the carbonization to terminal temperatures. The first stage in the present invention only drives out the low weight hydrocarbons which at ambient temperatures are gases and sets the stage for the completion of carbonization by a different method.

In the present invention coal is heated in 2 stages—(1) that done in the pro-carbonizer with hot gas, and (2) that done in the carbonizer with microwave heat. As noted, the gas storage pebble stove, and metering valve or mixing valve, all matters from the prior art, are not patentable. The gas entering the pro-carbonizer is held to a temperature of between 600° F. and 650° F., designed to produce in the coal a uniform temperature of about 600° F. by the time it leaves this unit. The point of raising the temperature to about 600° F. is that this is the lowest threshold temperature for the plastic stage in coal. As the coal leaves this unit, it is just beginning to melt on lump edges and fuse and the process has not proceeded far enough for this material to stick together and be a solid unit. Most of the light hydrocarbons—up to butane— have been driven off. The hot gas is introduced through the top of the pro-carbonizer over the entire length of the unit and is blown in at a pressure greater than one atmosphere. The precise pressure depends on the resistance of the coal bed as determined by size and shape of lump, and other factors inherent in the coal. Heat is transferred first to the surface of each lump, which surface then transfers the heat to the next layer of coal substance lying beneath the surface of each lump. This heat is then replaced from the hot gas flowing by. Such a flow creates in the coal bed a "thermal wave" in which the rate of temperature rise is high, above which is the zone in which the temperatures of the surfaces of the coal lumps are all at the top temperature of the gas, while the transfer of heat to the inside of the lumps is being completed. Below the "thermal wave" in which the rate of temperature rise is rapid is a zone in which no increase in temperature takes place, all the heat having been extracted from the hot gas before it reaches this space. We have here three zones—the top one in which the temperature is all uniform at the surfaces of the lumps, roughly that of the temperature of the gas being introduced, a second zone in which the temperature is rising very rapidly, and a third zone in which the temperature is not rising. The second, or thermal wave zone, gradually moves down through the bed of coal.

It has been demonstrated that in such a thermal wave the entire temperature gradient is contained in a space nine particle diameters wide. This is supported by mathematical theory through the iteration of the thermal conductivity coefficients. Thus, if you have coal particles one inch in diameter, the thermal wave would be 9" across. If the particles or lumps were ½" in diameter, the thermal wave zone would be 4½" across. Both mechanical handling considerations and microwave energy computations indicate that the particle size is best in diameters within this range, and since the depth of the coal bed in the pro-carbonizer is designed to be at least 24" deep, there is plenty of room in such a bed for all three zones to which reference has been made. The direction of movement of the "thermal wave" is diagonal across the bed; downward as a function of the flow of gas, and sidewise as a function of the movement of the coal on a carrier belt. Its downward movement has a value in the neighborhood of 1" per minute, depending on pressure, and volume of gas flowing. The lateral movement has nothing to do with the movement of the thermal wave, and is controlled by the operating rate of the system as carried out by the relative speeds of the conveying belts in stages 1 and 2, these speeds being controlled by power requirements and the 2" penetration of microwave energy. There is no loss of heat from a bed of coal in such an apparatus until the bottom of the thermal wave touches the support on which the bed of coal is carried through the pro-carbonizer. As the length of the bed is continued past that point laterally, the loss of heat in the gas passing through the coal in the pro-carbonizer increases. As the top of the thermal wave zone reaches the bottom of the bed and itself touches the support underneath the bed of coal, the heat loss becomes total (it is all passing through at that point). By using pressure in a minimum value sufficient to balance the pressure drop across such a bed, the location of the point at which heat loss becomes total is moved towards the lower end of the bed and the loss is reduced. It will be noted that the temperature of the gas entering is uniform across the top of the bed at, say, roughly 600° to 650° F. The temperature of the gas exiting from the bottom of the bed will be cold at the upstream end of the movement of solid material and will approach the top temperature referred to above at the downstream end of the bed. The temperatures of the exiting gas will increase very little until the bottom of the moving thermal wave zone intercepts the bottom of the bed of coal at which point the temperature changes very swiftly or at the rate of 100° F. per inch. The gas being passed through has not been changed in character, it has instead picked up components to itself from the coal, but it issues at a variety of temperatures. When all the gas issuing is mixed you get a larger volume of gas than was put in, but you get it at a uniform temperature intermediate between the temperature at which it is put in and the ambient temperature.

Heat is transferred within coal substances at the standard rate of ½" per hour, subject to the following limitations:

(1) The rate of movement varies directly with the 2.4 power of the absolute temperature.

(2) The time required for the movement varies inversely with the square of the diameter of the particle treated.

The heat absorbed in coal varies with the temperature at which absorption takes place, with the incidence of cracking reactions, and wtih the incidence of vaporization. Thus, the heat required to raise one pound of coal from temperature 300° F. to 325° F. will be much less than the heat required to raise the same lb. of coal from 600° F. to 625° F. The heat absorbed per degree rises steadily with the temperature. The cracking reactions which occur below 700° F. are endothermic, the cracking reactions which occur from 700° F. to 900° F. tend to be exothermic, and cracking reactions occurring above 900° F. tend to be again endothermic. As each compound is vaporized, each unit vaporized absorbs a finite amount of heat which must be included at the temperature at which vaporization occurs. There are, therefore, a number of elements involved in the heat burden and each element occurs at a specific temperature. There is a way to compute the overall heat burden consumed as a combination of all the elements, and this method will be discussed separately in this specification.

As noted, the coal passing through the apparatus has been heated to a temperature of approximately 600° F. by its passage through the pro-carbonizer, or first stage. It is then transferred to the carbonizer, where the heating process is completed by the application to it of microwave power. As noted, the equipment necessary for the generation of this microwave power is not described in detail in this specification, it being no part of the patentable art of this invention. The specific advantages of microwave heating which dictate its use in this process are as follows:

(1) Microwave heating can be precisely controlled as to the amount of heat applied so that a precise temperature of the charge to within a single degree F. can be maintained at all times.

(2) It has the advantage of providing extremely uniform heat. All parts of the charge are at the same temperature; the center of each lump is at the same temperature as the surface of that lump, and the bottom of the bed is at the same temperature as the top; and the area outside the charge is at a temperature no higher than that of the material being heated, so that the chemicals emerging from the coal under the effect of the heat generated by microwaves are not subjected to any temperature higher than that needed to release them from the coal.

Before proceeding to the specification of the apparatus required for the use of microwave, a distinction needs to be made between 5 types of heating carried out with electric power and the frequencies involved.

The first four of the following five types of electric heating are commonly carried out in furnaces or ovens. In view of the novelty of the microwave technique, no name has been assigned for the chamber in which it would be used. The types follow:

(1) Arc heating, in which there is a violent electrostatic condition created between two electrodes immersed in a fluid (gaseous or liquid) which generates the heat.

(2) Low frequency resistance heating (500 to 1,000 cycles per second) in which the electric current is passed directly through the charge from electrodes, and the heat is generated by the resistance of the material which conducts, it but not well.

(3) Induction heat where the electric current is passed through a coil surrounding the charge, and where it creates a reversing magnetic field. The source of the heat is a friction effect created in the material by the rapid flux of the magnetic lines of force. This is of particular use in cases where the charge is highly conducting and would not lend itself to resistance heating as in (1) and (2).

(4) Dielectric heating is used where the charge is not in any way a conductor and where high frequency current (in the kilocycle range) and high voltages of up to 15,000 volts creates a friction or electrostatic effect which provides heat. In this version the electrodes are not allowed to touch the charge.

(5) Microwave heating differs sharply from the other four, in that alternating current is not used while at the same time the frequencies used are in the megacycle range, not the kilocycle range. Microwave radiation is not properly speaking a current or a wave. It is produced in electronic apparatus by the effects on direct current of a rapidly fluctuating magnetic field, which, in turn, is excited by a high frequency oscillator. The result is as though the upper half of a wave form had been compressed at the peak value and the rest of the wave suppressed. What moves are bunches of electrons spaced by the difference between wave crests. This radiation carries energy—both electrical and kinetic—and directed at dielectric materials the energy enters the molecular and atomic structures and raises the energy level. It follows that the higher the energy level the higher the amount of heat and since temperature is a measuring rod for the measurement of heat, the greater the heat the greater the temperature. In materials there is no friction effect, simply the presence of additional energy in the chemical structures or more heat than can be accommodated in those structures at their former temperatures. The structures assume temperatures consonant with the new energy level. In the case of coal, the complex structures break down and certain of the bonds loosen so that the molecular structures can be separated. There is no heat gradient from the outside of the particle of coal to the inside; therefore, no temperature high enough outside the coal to provide secondary reactions in the chemical products. Microwave heating is electric in nature, but it behaves as though it were light, reflecting from metallic surfaces, which conduct the electricity, as though such surfaces were mirrors. If the dielectric material is supported on top of a metal it is heated, since the dielectrics absorb the microwave energy and the microwave energy is reflected from the metal below it. The metal remains essentially cold.

Microwave energy in this context is difined by order of the Federal Communications Commission which, pursuant to the Communications Act of 1934, has control over all frequencies of radio frequency radiation which may be used for communication and all operations of other devices in any of these frequencies which would interfere with such communications. Seven channels in the radiation spectrum have been set aside for industrial, scientific and medical purposes at various frequencies defined by a central frequency ± a tolerance. All industrial uses are included here, along with scientific uses such as the cyclatron and the medical uses are represented by diathermy machines for the relief of pain. Seven bands of frequencies are permitted: 13,560 kilocycles, 27,120 kilocycles, 40,680 kilocycles. (These three are used for dielectric heating.) 915 megacycles, 2,450 megacycles, 5,850 megacycles and 18,000 megacycles. (These last four comprise the field for microwave heating.)

On any of the four frequencies, the energy may be prepared in microwave tubes in types now manufactured by the microwave engineering companies. For the present invention they will furnish both the microwave tubes and the wave guides which will convey the radiation into this operation. In the apparatus a cone of radiation spreads out at an angle of from 15 to 30 deg. from the end of the wave guide and the charge passing through this radiation field is heated to any desired temperature, the process being explosively fast and being completed in a matter of seconds. Experiments conducted by the inventors would indicate that in 15 seconds from the time the carbonaceous material comes in view of the stream of radio frequency energy the temperature of the entire charge in view will have been raised uniformly throughout the entire charge from 600° F. to approximately 800° F. The energy provided goes to total loss as heat in the charge and so with coal particularly because of the carbon content. All engineering computations on coal may by taken at 100% efficiency.

The two operations thus described comprise the heating part of the present apparatus. In the pro-carbonizer where carbonaceous material is treated with heated gases, the pressures maintained are greater than atmospheric; while in the carbonizer, where the material is treated with microwave energy, the pressure maintained within the carbonizer is negative. In the pro-carbonizer the effect of the greater than atmospheric temperature is to suppress the boiling of all compounds other than the fixed gases. The effect of negative pressure in the carbonizer is that it depresses the boiling and vaporizing temperatures for all the carbon compounds released from the coal. With a reduced mass of gas in the atmosphere interposed between the wave guide and the coal charge, less microwave energy is absorbed by such gas and more moves directly into the coal charge. The overall effect of both these items is that the heat required from microwave is decreased; economy of microwave operation is increased.

Having thus described in general the two stages of the process which relate to heating, it becomes proper to proceed with a summary of the various drawings attached as part of this application, specifically those to which reference was deferred earlier, dealing with parts of the apparatus in the heating stage. FIG. 1 has been described, being, in essence, a flow chart of the overall process. FIG. 2 is a drawing in perspective of the arrangement of the parts, heretofore described, as seen from the outside. FIG. 2 is not designed to convey in precise detail the appearance of the apparatus to be built, but it does delineate the parts thereof. FIG. 3 is a cross-section of the same apparatus split down the center longitudinally, taken on section line 3—3 of FIG. 2. A separated part of FIG. 3 is a schematic drawing of the massive quench, that part of the apparatus to which the vaporous chemical materials pass through the parts shown in FIG. 3. FIG. 4 is a cross-section of a small part of the apparatus shown in the schematic drawing included as a separated part from FIG. 3, taken on section line 4—4 of the small separated drawing included along with FIG. 3. FIG. 5 is a cross-section in some detail of the same apparatus taken on section line 5—5 of FIG. 4, and rotated so that the direction in which the apparatus is viewed is perpendicular to that shown in FIG. 4. FIG. 6 is a cross-section detail of a part of the apparatus depicted semi-schematically in FIG. 4, shown on section line 6—6 of FIG. 4. FIG. 7 proceeds beyond the massive quench, basically covered in schematic drawing in FIG. 3, and represents a cross-section of the vapor phase differential condensation part of the apparatus included only schematically in the figure separated from FIG. 3. It is taken on line 7—7 of the schematic drawing attached to FIG. 3. FIG. 8 is a vertical cross-section of the same apparatus in which more than one unit is depicted, taken on section line 8—8 of FIG. 7. Thus, FIGS. 7 and 8 are two views of the same apparatus. FIG. 9 is a further detail of part of the apparatus shown in FIG. 8, taken on section line 9—9 of FIG. 8. FIG. 10 is a detail cross-section taken on section line 10—10 of FIG. 8, showing the drive by which apparatus shown is rotated. FIG. 11 is a further detail of the apparatus shown in FIG. 8, taken on section line 11—11 of FIG. 8.

We return to the detail description of FIGS. 2 and 3:

FIG. 2—Coal enters through hopper 1, passes down to buffer section 2, hot gas enters from a metering or mixing valve through port 3 set in top of the chamber, coal is fed to the heating chamber 6 through coal wheel, shown by its casing 4, operated by drive 5, and passes into the chamber 6 through which it is conveyed, hot gas leaving this chamber exits through port 7 set in the side of the heating chamber. As was noted earlier, gas exiting through port 7, which is in multiplicate exits at a variety of temperatures and is mixed in the main leading it back to gas storage so that it becomes of uniform temperature.

It will be noted that this view does not show any of the coal conveying apparatus. Coal leaves the pro-carbonizer chamber through buffer section 8, passing through coal wheel shown by casing 9, into a second buffer chamber 10, and through still another coal wheel shown by casing 11, to enter the carbonizer in which it will be subjected to microwave energy. Microwave energy enters through antennae schematically depicted 12, set in the top of the chamber. Gas driven from the coal by the temperatures existent in the carbonizer, exits through port 13. As was noted, all gases leaving this chamber are uniform in temperature. Coke residue, known as char, exits from the carbonizer through buffer chamber 14, passes through coal wheel depicted by its casing 15, and through another buffer chamber 16, being discharged to atmosphere at this point. The cross-section drawing, FIG. 3, covers roughly the same ground. Coal enters through hopper 1, passes through buffer chamber 2, and through the coal wheel shown by casing 4, into chamber 6. The veins of the coal wheel are depicted as 4a. Coal here is depicted upon endless belt 17, which is driven by power wheel 5. The hot gas enters from the mixing valve through port 3, set in the top of the chamber 6. Coal passes through this chamber, known as the pro-carbonizer in FIG. 1, at a relatively slow rate and falls off the end of the belt 17 into buffer chamber 8. The hot gases, both those introduced and those generated from the coal, exit from this chamber through port 7 in multiplicate. After passing through the buffer chamber 8, coal enters coal wheel shown by casting 9, with its veins depicted 9a, and goes into another buffer chamber 10, thence passing into another coal wheel shown by casing 11, formed by its veins 11a. From coal wheel 11, the partially carbonized coal is deposited on conveyor belt 18, which conveys it through this chamber at a rate in inverse proportion to the depths of the two beds and dumps it into buffer chamber 14, which leads to coal wheel 15, depicted by its veins 15a, and passes out of the apparatus as char, through buffer 16, the whole driven by power drive 5. Another power drive 5a is at the other end of this belt. Similarly, in the carbonizer the belt that moves under the coal and supports it is 18, and the power source is the power wheels not identified by number. The matter of drive for the carbonizer will be separately discussed.

The reason for buffer chamber 2 is to provide a slight gravity component to the movement of this coal, thereby reducing the power load on coal wheel 4 and 4a. The purpose of such a wheel is to provide a continuously open door and, at the same time, a continuously closed door (a revolving door). This prevents the escape of gases generated within the chamber. Similarly, the coal wheel at the other end of this chamber, 9 and 9a, prevents the escape of gases so that the pressure in the pro-carbonizer, shown by numbers 2 through 8, can be maintained above atmospheric. The purpose of buffer chamber 10 is to facilitate the change of pressure which comes about as coal passes from one chamber to the other. The pro-carbonizer is operated above atmospheric pressure, the carbonizer shown by numbers 11 through 16, is on at negative pressure, and the buffer chamber between facilitates the maintenance of this pressure by the coal wheels. The chemicals to be refined pass out of the carbonizer through port 13, and re-appear as that line of piping enters the massive quench apparatus at inlet 19. This, then, is an apparatus for the semi-destructive distillation of coal in two stages. The first stage is carried out by gas, heated to a low temperature as such temperatures go in coal processing, after which the coal is then passed under microwave energy which provides an extremely efficient, economical controllable heat of a uniform character and thus brings the entire coal up to a temperature at which all the recoverable and useful volatiles are driven out. Since, in the pro-carbonizer, one wishes a depth of coal more than 9 layers of particles thick to permit the formation of the steep fronted thermal wave which moves down through the coal, the lower limit for the depth of the coal would be 9 particles deep and the upper limit is set by the weight of the coal which would accelerate the fusing of these particles into a solid mass which could not then be handled. In this embodiment of the invention it has been set for the pro-carbonizer without limitation thereby, at 24″. The penetration of microwave energy of the frequencies which can both be generated and generated in equipment of usable size is about 2″. If you have a depth in one chamber of 24″ and a depth in the second chamber of 2″, the belt in the second chamber is going to have to move 12 times as fast as the belt in the first chamber in order to move equal weights of material through. This is provided for by interlocking of all the drive wheels. The drive for the apparatus is provided by a water wheel set into the wall of the carbonizer. Both power and velocity are set by the height to which the water is raised before it reaches the turbine drive in free fall. A major advantage is the fact that a wheel can be sealed into the wall to prevent the escape of microwave radiation. Minor leakage of water into the carbonizer is of little consequence.

Having thus heated the coal to a controlled, but extremely low temperature for processes of this kind, and having in the process eliminated from it as gases all those chemicals which are of commercial use, as well as a number of materials of higher molecular weight, we now turn to a discussion, not related to drawings, of the process by which we propose to recover these chemicals in their primary and original form as liberated from the coal.

The massive quench consists in general of a piping circuit in which moves a quench oil into which a gas stream is introduced at a given point. The combination gas and oil stream flow together for a distance and then are allowed to separate. A sump is filled with an oil, which might be heavy fuel oil, a high number diesel oil, or any similar oil having a boiling point higher than the temperature predetermined as that temperature which will separate into two groups all those chemicals present. The use of a high boiling oil is to reduce the incidence of uncontrolled amount of boiling in the oil, with consequent loss of heat. This oil is pumped through a pipe circuit until at some convenient point the gas stream from the carbonizer is introduced to the center of the oil stream at high velocity to a special type nozzle to be described later.

The combined gas and oil stream flow together for a distance sufficient to permit all the gas to be absorbed or dissolve in the oil. This is generally in the neighborhood of 10 ft. Afterwards, the combined oil and gas stream is jetted into an open chamber of considerably larger size, through a series of rotating blades which break up the oil stream into a multitude of fine drops with a vast surface for the gas-liquid contact common in distillation apparatus. Those compounds in the gas with boiling points lower than the temperature of the oil (the break point temperature) escape overhead through a stack, from which they are drawn by a suction pump and are fed to the fractionating equipment to be hereinafter described. The pressure in the stack is held to near atmospheric by control over the pumps, obtained by conventional instrumentation. However, since the pressure in the pipe in which gas and oil were together may be as many as some hundreds of atmospheres, the decompression in the open chamber is explosive. The stack is baffled to prevent the escape of drops which would otherwise be carried up by the swift rush of gas. Those compounds present having boiling points higher than that at which the combined oil and gas stream is held are entrained in the oil and flow with it in free fall back to the sump, providing a relatively small increment to the volume there, a few gallons for every ton of coal processed.

What you have here is a total absorption of a gas stream in an oil stream, followed by partial desorption. The desorption is controlled by the temperature to which the oil stream is held, which, in turn, determines which compounds will pass out in the form of gas and which compounds will remain in the oil. Piping for gas from the carbonizer is brought to the center of the oil stream and is closed with a rotating cap, which has two or more nozzles fed into it at angles so that the gas issuing from these nozzles is directed away from the center of the pipe toward the sides of the oil pipe. The openings of these nozzles are on the downstream side at all times so that the edge forms a venturi which reduces the pressure in the pipe leading to the nozzle. The path of each gas jet forms a truncated cone, thus distributing the gas widely throughout the oil.

This apparatus obtains no substantial refinement of the gases, since it provides only for the separation of raw gas into two groups of compounds. All the lighter materials go off in gaseous form for further refinement, all of the heavier materials—at least those heavy enough to have boiling points higher than the temperature of the oil—are retained in the oil and are recirculated throughout the system.

A convenient break point temperature which provides a gaseous overhead composed of hydrocarbons of molecular weight up to about 212, subject to some variation because of the presence of branch chain materials or unsaturate radicals, would be 525° F. This temperature may be modified if, at any time, analysis of the raw gas coming from the carbonizer indicates the presence of commercial chemicals having greater molecular weight and thus higher boiling points, or the absence of commercial compounds having molecular weights in the temperature range just below the typical figure cited. Since raw gases coming from the carbonizer have temperatures of substantially 800° F. (ignoring heat losses in the piping), the function of this apparatus is to remove the heat in these gases so that their temperature falls from 800° F. to 525° F. in contact with liquid oil. The temperature of the oil is held constant by temperature sensing devices placed at the discharge end of the pipe where oil and gas together are discharged into the open chamber. This is the critical heat control point at which a break point temperature is maintained.

Buried in the sump is a heat exchange device. This device is designed to take out of the oil in the sump all heat in excess of that required to maintain the break point temperature desired. It consists of tubes in which water is permitted to boil, combined with agitators to provide turbulent flow of the oil over heat exchange tubing. It is controlled by temperature sensing devices, of conventional design, regulated to take out more or less heat depending on the temperature of the oil at the discharge point upstream. The volume of oil and its temperature are controlled in order that it may have just the requisite amount of heat absorbing capacity in its flow between the gas nozzle at which gas at a higher temperature is introduced and the discharge outlet, at which point the temperature of the oil must be at a predetermined level and held constant at that point.

For clarity we describe at this point a non-patentable device which has been generated for the purpose of permitting the automatic programming of this equipment. This device is a step of mind which we have termed the differential enthalpy matrix. All of the various types of heat data to which reference has been made are entered in the matrix at the appropriate temperature point; thus, in heating one lb. of a liquid from a given temperature ($a$) to a given higher temperature ($b$) a certain amount of heat is required. This amount of heat is one cell of the matrix. In heating the same lb. of a liquid from a higher temperature ($b$) referred to, to a still higher temperature ($c$), a slightly different amount of heat will be required. This becomes a second cell in the matrix. Taking the pound of the same material through all the temperatures from ambient to 800° F. generates an entire row of cells for the matrix. Listing a number of materials and taking them all the way or to that temperature at which they leave that part of the apparatus, generates a number of rows of cells in the matrix. The heats of reaction, plus or minus the heat losses from piping, and other heat data can be entered in the matrix with reference on one axis to the cause or origin of the heat item and on the other axis at the temperatures at which it occurs. In the carbonization of coal, for example, the cracking reactions up to about 700° F. are endothermic. Certain reactions in the 700° F. to 900° F. temperature range are exothermic. Reactions in the higher temperature ranges are again endothermic. Each separate reaction can be entered at its appropriate temperature. The heat requirement can be very greatly altered by the selection of the temperature at which the process is stopped. By representing the heat burden item by item, and temperature by temperature, we obtain a matrix which does not produce a determinent, but instead expresses the total heat requirement of carbonization or distillation for a given number of items, a given number of heat elements, a given number of temperatures, and a given mass for each item.

For programming purposes it can be assumed that the system of coal processing described here is being operated at its full capacity per operating unit of 50 tons per hour, or 1,666 pounds of coal per minute. The break point temperature, important in programming because of its effect on the heat capacity in B.t.u.'s per pound per degree F. of the hot oil, is set at 525° F. The rate of operation is important in terms of the total heat burden required to be absorbed in the oil in the process of cooling the gases to the break point temperature. It is also important in determining the volume of gas to be introduced into the oil stream.

In line with component equipment now available, a flow of oil through the circuit lines has been set at a standard 400 gal. per min., which may be taken as unity in the programming computations which follow:

We assume a matrix prepared to govern the condensation step of this system of chemical recovery, using the temperature range and the rate of operation stated above. The heat burden is found to be 30,345 B.t.u.'s per minute. The weight of the gallon of the oil to be used in the circuit is taken to be 7.50 lbs. per gal. Allowing for specific gravity or density changes at temperature, with a projected use of 400 gals. per minute, this gives a weight of oil to be pumped through the system of 3,000 lb. per minute. Experimental data gives its heat capacity at this temperature range at .61 B.t.u. per lb. per degree F. Thus, the heat capacity of the oil per degree F. is computed to be 1830 B.t.u.'s. From this it follows that in this example the control temperature of the oil entering the circuit at the pressure pump from the sump must be 525° F. minus 16.6 deg. (30,345/1830), or 508.4° F. An oil pumped at 508.2° F. absorbs the proper amount of heat from the gas with which it is in intimate contact and reaches the discharge point at the proper temperature of 525° F. Heat losses in the piping are ignored for the purpose of this example. If a flow of oil of 500 gals. per minute were used, the temperature differential required would be 13.2° F. instead of 16.6° F. If the plant were operating at half capacity and the other variables remain unchanged, the temperature differential would be 8.3° F.

The heat exchange device buried in the sump is controlled in accordance with these computations. To take out the excess heat brought about by the partial desorption from the oil after it has absorbed these gases, the heat exchange device might be of any number of conventional apparatus. By having a sump capacity of, say, 2,000 gals., all possibilities of heat exchange relation being overmatched are eliminated. This example has been used only to illustrate and does not restrict the process herein described to these particular figures.

New and novel equipment has been invented for the vapor phase fractionation of the potentially commercial chemicals, consisting of the medium and low molecular weights hydrocarbon compounds obtainable from coal tar and from low temperature tar and also from the processing of petroleum gases. The fractionator is a device for the differential condensation of chemical compounds in order of boiling point. It has the following elements: (1) A pipe or gas main through which the gas to be refined at any particular stage is to be passed, with gas pumps of conventional design engineered for the use of hot gases; (2) At intervals of 2 or 3 feet, bulges of a particular shape, having a diameter greater than that of the gas main, are attached. These bulges are designed to accommodate the tips of sets of rotating blades or condenser surfaces, which also have a diameter greater than that of the gas main; (3) The rotating condenser surfaces, in pairs, are hollow, having a space between the upstream and downstream side in the order of magnitude of ¼" for the passage of liquid; (4) A central pipe mounted in flanges and so mounted as to be free to rotate on its own axis; (5) A small fluid turbine mounted on the central pipe mentioned above and designed to provide power for its rotation at a constant speed; (6) A reservoir for liquid mounted within the gas main and so mounted that the central pipe for liquid dips below the surface of the liquid in the reservoir and remains so at all times; (7) A pumping device attached to the bottom of the central pipe for the purpose of moving liquid from the reservoir up through the central pipe to the hollow blades mentioned in point (3) above; (8) Heat exchangers mounted between any two bulges in the gas line and between them and the reservoir at the bottom of the central pipe. Each of these elements will now be discussed separately.

The fractionating system consists of a series of sets of the elements listed above, the output of one set of the elements in gas being the input of the set next downstream in line. Each set of the elements of the fractionator collects one fraction and sends the collected liquid to storage for commercial sale and the gas residue containing all hydrocarbons not condensed at that given stage is passed to the next set of element downstream where the next fraction is collected. This process continues until all condensable elements have been removed from the gas. The gas to be fractionated is pumped from the massive oil quench to the gas main leading to the first set of elements and then down the line, which periodically is reduced in size in order to maintain in the line a velocity which will facilitate the process. This size reduction will be discussed further under a statement on programming the device (cut 13).

At intervals along the gas main, preferably at distances of from 2 to 3 feet, the gas main is enlarged by the insertion of pipe sections (bulges) where the flange upstream is perpendicular to the axis of the gas main, and the flange downstream is slanted at an angle pointing downstream to form a collecting trough at the downstream edge of the enlarged section. The enlarged sections are a few inches greater in diameter than the gas main in order to accommodate the tips of the rotating blades in place inside the bulges.

The rotating blades, or condenser surfaces, are the key to this fractionating device and the other elements of this process exist to make the blades operate. Each blade is hollow, with an opening to the central pipe mentioned above, and with the entire outer end of the blade open for the passage of liquid up the central pipe, out through the blade, and into the collecting ring, which has just been described. The space between the upstream side of the blade and the downstream side is on the order of ¼" to ½" and the upstream side of the blade is slanted slightly downstream for two purposes, as follows:

(A) Centrifugal force is driving the liquid out through the blades and the slight slant downstream forces the moving liquid to cling to the inside of the upstream face of the blade in a thin layer, in such a relationship to it that it can perform a heat exchange function.

(B) The slight constriction of the opening toward the tip is consonant with the increased width of the opening at the tip of the blade as compared with the width of the opening to the pipe.

Each blade is in the form of a Maltese cross. This configuration gives the best compromise between maximum area for heat transfer, adequate area open for the passage of gas in the gas main, and strength to withstand the centrifugal forces on the thin metal of which the blade is fabricated. In any given bulge attached to the gas main, two blades are combined as a set, turned in relation to each other at 90° angles so that the entire area of the gas main is closed by heat transfer surface while, at the same time, half of the area is always open for the tortuous passage of gas. The flow of liquid is proportioned between the first blade and the second blade of each pair by regulation of the opening to the central pipe in the downstream member of the pair. The outside, upstream surface of each blade is roughened in order to disrupt the flow of gas over the blade and to create turbulent flow which improves the efficiency of the heat transfer there through.

In operation, the liquid taken as coolant makes the circuit from reservoir at the bottom of each short section of central pipe, up that short section of pipe, out through a blade, or condenser, into the collecting ring, then to a heat exchanger which removes the heat picked up in its passage in indirect contact in the hot gas stream, and back to the reservoir. In each stage of condensation, the liquid coolant is selected which, in composition, is identical with the fraction which it is desired to collect at that particular stage. Thus, there is no problem arising from commingling of the condensate and the coolant in the collecting ring. It has been found that over a period of operation under steady state condition any differences in composition between condensate and coolant at the start of operation disappear and whatever lighter compounds are present pass off as gases and are recondensed at their proper temperature level downstream. The gas in the line passes over the upstream side of the blades, and transfers heat to the blades which, in turn, transfer it to the liquid passing through the blades. It would seem as though this heat then goes back into the condensate and changes it back to the gaseous state. How this is avoided will be explained under that section of the specification describing the programming of given fractions.

The central pipe (for liquid coolant) is fabricated in short sections—one for each pair or group of pairs of hollow blades—and is mounted in flanges so that it can turn freely. To it are attached those blades which must rotate with it. The size of this pipe is proportioned by the amount of coolant to be passed through it and the relative size of the gas main in which it is mounted.

Since pipe and blades are operating at elevated temperatures, no conventional motor drive could be devised which could be placed inside the apparatus. The problem was solved by attaching to the central pipe a small liquid turbine, curved blades attached to the pipe, in a small housing, with a liquid supply line running perpendicular to the gas main. By control of the pressure and velocity, a constant speed of rotation is attained, since the blades cannot move faster than the liquid passing them. Since this drive structure is extremely light, the additional load created is minute.

The central pipe has in its lower end a reservoir in which coolant is maintained at a constant level. This reservoir is mounted in the upper end of that bulge in the gas main pipe next downstream from the pair of condensers served by the reservoir, so that there can be a space around it for the passage of gas. The coolant is fed to the reservoir through a pipe coming from the heat exchanger and separated from the pumping device mounted in the reservoir by a baffle to prevent turbulence from affecting it. The coolant is maintained at a high head in the pipe leading from the heat exchanger and in the bottom pan of the heat exchanger. This is simply an enclosed pot from which coolant may be drawn as required to maintain the flow.

The pumping device attached to the bottom of the pipe consists of (1) a pipe extending from the bottom of the central pipe radially a short distance; (2) an opening in the end of the pipe faced horizontally in the direction of rotation of pipe blades and pump. Such a pump scoop has sufficient power to lift the liquid through the head of from 2 to 3 feet at a maximum. This is all that is required since the return flow is by gravity.

The entire set of rotating condenser surfaces is operable vertically but not horizontally, because the vertical throw of centrifugal blades is limited and they are not adapted for horizontal operation. Thus, fractionation occurs either on the upward reach of the gas main or on the downward reach. If the gas in the main is flowing upward the blades are turned so that the dihedral faces the oncoming gas and the pumping device inside the line is eliminated, the reservoir for coolant is set above the blades and liquid flows to the blades by gravity. The liquid is thrown to the collecting ring as in the form stated and is then pumped to the heat exchanger, which may be mounted well above the set of blades for which it is designed, flowing to the central pipe reservoir by gravity. The pump in this instance may be a conventional design, and is mounted outside the gas line rather than inside.

The following statement of programming procedure for the operation of a Differential Fractionating Condenser just described will clear up certain questions which may be left unclear by the foregoing statement of apparatus design. The chemicals to be obtained from the vapor phase refinement of the gases obtained by the low temperature of carbonization or semi-destructive distillation of coal cover a wide area of the chemical spectrum, particularly in the field of purely hydrocarbon compounds. A master list prepared from experimental work, based on a wide variety of coals, numbers something over 1,000 chemicals. Of this, a particular coal will give only a selected group from this list, and the amounts of each to be obtained will be specific in value for that coal. From experimental work on a given coal, 122 chemicals were determined to come from that coal with masses shown for each item. These chemicals were divided into fractions, based on a temperature differential between control temperatures on the order of 3° C. or 5.4° F. Since the temperature limits over the list were 270° C. (525° F.) and 15° C. (59° F.), this means a possibility of 85 fractions; in fact, our 122 chemicals are found in 63 of the possible 85 fractions and our example is based on basic data, without consideration of the 22 missing fractions.

Cut No. 13 is defined by its temperature limits of 234° C. to 231° C. (453.2° F.–447.8° F.). The chemicals to be condensed and their masses as determined by experiment are: Pentamethyl benzene, 4.494 lbs. per ton of coal; Tridecene, 2.901 lbs. per ton of coal. Total weight of the fraction condensed is 7.395 lbs. of liquid per ton of coal. In computing total shrinkage in volume of gas passed, the absolute temperature at which the gas enters the unit is used. In this case, 913.2 deg. on the Rankin scale. Since the coolant to be used has the same composition as the condensate, a coolant mixture having the same relative proportions of chemicals is used for computation with additive characteristics taken on the weighted average of absolute masses, rather than the weighted mole average.

The first computation required is that of gas velocity, since a velocity high enough to maintain substantially turbulent flow through the pipe is required. At the same time, the velocity required must not be unduly high for the pumping component behind the gas. Operating rate of the system is taken at 50 tons per hour, or 1,666 lbs.

per minute and also applies to any computation in terms of heat burden to be handled by the apparatus.

Reading from a previously prepared matrix stating volumes of gases at all temperatures and pressures, the figure for standard cubic foot of gas reaching the fractionation (cut #13) is 1,272.5 standard cubic ft. per ton of coal processed. Applying the operating rate, this provides a gas volume in the gas main just upstream of the blades in cut #13 of 1,057.7 standard cu. ft. per minute. A gas main 13.5" in inside diameter is planned, thus getting an area of exactly 1 sq. ft. Computation gives the required gas velocity in feet per second of 17.63, which is satisfactory, large enough to promote turbulence and not too large for standard pumping.

Since two chemical components of the gas are condensed at this point, their volume is removed. Computed on standard weights and volumes, the reduction in volume from this cause is 17.3 standard cu. ft. There is also a decrease in volume from the reduction in absolute temperature ($v/v_1 = t/t_1$); here it is computed to be 3.5 standard cu. ft. The sum of these reductions is 20.8 standard cu. ft. which subtracted from the entrance volume gives an exit volume of 1,036.9 standard cu. ft. per minute. This figure then becomes the entrance volume for fractionation state #14 with a velocity of 17.28 cu. ft. per second.

When this process is repeated time and again, the volume being passed steadily declines, and if the pipe were kept to the same size, the velocity would eventually drop to a point at which it would not generate turbulence. Thus periodically the size of the gas main is reduced to maintain the velocity. For example, if we assume that the volume passed has dropped from 1057.7 standard cubic feet with a velocity of 17.6 feet per second to a volume of 529 standard cubic feet, which, in a pipe suitable for 1057 standard cubic feet, would have a velocity of 8.8 feet per second, a reduction in pipe size to 10 inches inside diameter would restore the velocity to 17.7 feet per second.

The heat burden for cut #13 consists of three elements; (A) Heat of vaporization of compounds condensed; (B) the sensible heat to be removed from the compounds removed in this stage (computed on heat capacity at this temperature, multiplied by the number of degrees of temperature reduced) and the product of these multiplied by the weight of chemicals condensed; and (C) the sensible heat in all the compounds passed through this stage of fractionation but not condensed. The figures per ton of coal are as follows: Pentamethyl benzene, 626.4 B.t.u.'s; Tridecene 317.1 B.t.u.'s; sensible heat of Pentamethyl benzene, 11.4 B.t.u.'s; Tridecene 9.1 B.t.u.'s; sensible heat of non-condensed gases 809.3 B.t.u.'s. The total of these figures is 1,773.3 B.t.u.'s per ton of coal which, corrected for the operating rate, is a total heat burden for this stage of 1,477.8 B.t.u.'s per minute. These are figures which govern the design of the apparatus covered in this invention.

Since the condenser blades are fabricated from an alloy with a high thermal conductivity there is no problem in transfer of heat. As an example, an aluminum alloy with a suitable tensile strength (5050) can be computed to have for a gauge 18 sheet a heat transfer capacity in the service stated of 3,652 B.t.u.'s per minute against the requirement for 1,478 B.t.u.'s per minute, a safety factor of better than 2:1.

There remains to be computed through the programming procedures the proper conditions for maintaining the volume of coolant to be supplied to the device and its temperature as it leaves the heat exchanger in the sump at the proper level in order to permit it to absorb the required amount of heat from the surfaces of the rotating blades. It is assumed that the flow of coolant for a fractionating or condensing surface set in a 13.5" I.D. pipe is 40 g.p.m. requiring a 2" central pipe. The coolant being identical with the desired condensate weights and heat capacities may be taken as additive and computed give a heat absorbing capacity for the mixture of 151.3 B.t.u.'s per degree of temperature differential for the 40 g.p.m. Dividing this into the total heat burden to be absorbed, we find that the coolant reaching the central pipe in the fractionating device must have a temperature of 9.8° F. below that of the desired interface temperature in the rotating blade. Thus, the thermostatic control of the operation of the heat exchanger can be set to maintain a coolant temperature entering the central pipe of 438.0° F.

The flow of 40 g.p.m. can be taken as unity on computing figures and provided a single set of rotating blades is used for this stage, the use of less than 40 g.p.m. would increase the temperature differential in inverse proportion. Similarly, the use of two stages of condensation, each with a flow of 40 gallons per minute in the circuit, would reduce the temperature differential from 9.8° F. to 4.9° F. Sharper definition of the fraction is obtained by this manner of operation. It is also possible to accomplish the result in a number of stages, each set with a different temperature differential; perhaps regulating the first set to a 7° F. differential, the second set to 1.8° F. differential, and still a third set at 1° F. differential, all within one stage of condensation. The build up of condensate in the bottom pans of the heat exchangers attached to each of these stages is removed by overflow devices, designed to maintain a constant volume of condensate-coolant in the system. The overflow is then conveyed to storage for packing and shipment as finished chemicals ready for sale to predetermined market specifications.

The programming problem changes as the fractionization proceeds. In the earlier cuts in the series (at higher temperatures), the heat of vaporization is a minor part of the heat burden and the sensible heat from the gas passed through is major. In later cuts, particularly as it approaches cut 85, the positions of the heat burdens are reversed. Since the coolant will begin to boil before it reaches its theoretical boiling point, the excess heat extracted by boiling will cool the coolant to a temperature below the programmed temperature, which, in turn, corrects itself by reducing the boiling. As the vapors from the boiling coolant commingle with the condensate, it will return this heat to the system and will restore the required temperature. This, then, is a self-regulating exchange of heat.

Having thus described verbally the operation of the two types of apparatus invented for the purpose of proving differential fractional condensation from a vapor state of the desired chemicals, we will turn to the drawings and the further explanation proceeds through FIGS. 4 to 11, inclusive.

It was noted above that gas main 19 in the schematic drawing attached to FIG. 3 is connected with the gas outlet from the carbonizer 13. The gas then passes through pump 20, shown in the schematic drawing, and enters the massive quench apparatus, which is detailed in FIGS. 4, 5 and 6. FIG. 4 is taken on section line 4—4 of the schematic drawing added to FIG. 3. In FIG. 4, the oil circuit from the sump enters through circuit pipe 28 into which is injected gas through main 19, terminating in a rotating head, the shell of which is 21, the nozzles of which are 22, and an angular shield designed to produce rotation is 23, oil circuit 28 continues past the break terminating in venturi nozzle 24, discharging the combined gas and oil stream through rotating blades 26, driven by gear drive 25. Section line 5—5 shown essentially the same apparatus rotated in view to be a cross-section taken vertically.

FIG. 5—gas from the carbonizer enters through main 19, and the rotating injection nozzle is shown schematically. Oil is moving through circuit 28, discharging into a series of rotating blades 26. The number of rotating blades shown, 4, is not limited in this regard and it could be any number sufficient to disperse the combination of oil and gas into a myriad of fine droplets. Since explosive decompression is taking place at this point, baffles 27 are introduced into the stack 27a through which the gas to be further fractionated exits. Oil discharged from this apparatus is in free fall in the bottom of the stack 27a, returning to the sump 30 through the heat exchange apparatus 31, the excess pitch accumulated exits through overflow 32. Oil pressure is maintained in the line by gear pump 29. This may be described as a continuously circulating oil bath into which gas is injected and then partially desorbed with control of the temperature and pressure conditions at at least two points.

Turning to FIG. 6, section line 6—6, takes us through the detail of the injection nozzle with the gas from the carbonizer moving in line 19, rotating head 21, and the nozzle for injecting the gas into the flowing oil stream 22, after which the combined gas and oil mixture move through line 28.

FIG. 7 is not connected with the earlier numbered figures through section lines. Its position is, however, shown by section line 7—7 in the schematic drawing connected to FIG. 3. FIG. 7 represents the view looking down the main as it proceeds to the vapor phase fractionating apparatus. The outer shell of the main through which gas is fractionated is shown 33, one of the fractionating differential condenser plates is 34, the central pipe is 35, and 36 shows the inner main through which gas is moved from one stage of fractionation to the next.

Moving to FIG. 8, taken on section line 8—8 of FIG. 7, the same apparatus is depicted, except in vertical cross-section rather than in horizontal. The gas to be fractionated arrives in the beginning of the system through pipe 37, through pump 38, and passes into the main shown 39. As it reaches the bulge in which the differential condensation apparatus is positioned, the gas to be fractionated impinges on upper dihedral surface of the first pair of rotating blades 34, and is cooled and partially condensed by the contact. The condensate is thrown sidewise, impinging on the outer shell of the bulge 33, and running down the inner wall thereof. Coolant at the same time comes up central pipe 35 and is deflected at the top of the column by shields 41. It passes through the rotating blade 34, passes out the tip end 40, and impinges on the outer wall of the bulge 33. The mixture of condensate and coolant, these items being identical, collects in the collecting ring 42, defined by the bottom 42a and the side 43. Since this ring is circular, the material flows through outlet pipe 45 to the heat exchanger 46, which removes from it such heat as is excessive and the material then passes through tube 47 into reservoir at the bottom of the central pipe 48. It is picked up by pump 49 and flows up to the central pipe to repeat the circuit. It is the overflow from this circuit which constitutes the chemicals ready for commerce. Thus has been described one pair of condensing blades and in the example used of cut 13, such a single pair would be quite adequate to handle the heat burden. The apparatus continues repetitively to any number of such pairs. The parts numbered in this drawing are repeated and no numbers have been assigned to them, the identity being obvious from the drawings. Each circular bulge on the main is defined by its top 44, its sidewall 43, and the bottom 42a. In FIG. 8, three section lines delineate the position of the detail shown in FIGS. 9, 10 and 11.

Section line 9—9 shows the internal structure of a single rotating blade, with one edge perpendicular to the line of passage of the gas and the other positioned upstream from it at a slight dihedral angle. Section line 10—10 shows the rotating turbine device positioned in the middle of the moving column of gas and causing the central pipe and the rotating blades attached to it to move. Section line 11—11 shows the pump which is positioned at the bottom of the central pipe for any related set of rotating blades.

In FIG. 9, the central pipe is 35, one of the blades in the Maltese Cross form is 50, and the same blade shows in another position 50a. 51 denotes the open space in any particular set of blades and sets constructed of the two blades would completely cover the entire cross-sectional area of the bulge around the main.

In FIG. 10, the inlet pipe for fluid to drive the central pipe on which the rotating blades are positioned is 53, the central pipe is 35, the veins of the turbine drive 52, and the outlet pipe for the driving fluid is 54.

In FIG. 11, the pump itself, a simple tubular device driven through the liquid material with an open end is 49, the tube by which coolant and condensate commingled reach the reservoir is 47.

It is to be noted in these drawings that parts which are repetitive have not been given numbers, but in each case the repetitive nature of these devices is obvious from the drawings. What has been shown is a preferred embodiment of the invention, essentially a device for the differential fractional condensation from the vapor state of a variety of chemicals.

There are two parts of the process and apparatus: (1) The heating of the carbonaceous materials to a limited and controlled temperature at which these chemicals are separated from the carbonaceous material in the vapor state with the means to prevent such chemicals from undergoing temperatures which would initiate secondary reactions, and (2) fractional differential condensation of the items. This is an integrated system and all parts of it from the pro-carbonizer through the final fractional condenser are linked. The essence of the invention is considered to lie in the use of microwave power in any form for the heating of carbonaceous materials to controlled temperatures. Secondly, the essence lies in a device for total absorption followed by partial desorption of the chemicals, followed by fractional differential condensation of each and every separate chemical fraction desired for sale.

It is unusual to combine in a single application method and apparatus, but in this case it appears to be proper. The apparatus is vital to the application of the method and the inventors have canvassed the field of technology in order to determine whether other apparatus could be used with the method. This does not appear to be possible. Conversely, the apparatus has been considered with reference to its usability without this method. Very little of the apparatus within the area of patentability dealt with is useful without the method. It is considered that in particular situations the differential condensation devices described here would be useful, but only in a few such situations. For such uses it can be abstracted without harm.

Having thus described the invention, we claim:

1. Apparatus for the pyrolysis of coal and the refinement of gaseous chemical products formed by said pyrolysis, comprising a combination of two heating chambers through which pass a conveying system for coal, consisting of an ingress chute with a coal wheel therein, a foraminous conveyor belt in the first heating chamber and a conveyor belt transparent to microwave energy in the second chamber, each of said belts having a synchronized drive means, a buffer chamber between said first and second chambers with coal wheels therein, and an egress chute with a coal wheel therein attached to the end of the second chamber, means for delivering hot gases to the first heating chamber, means in the first chamber for the subsequent withdrawal of the gases introduced and other gases liberated from the coal by the heat present, means to maintain the first chamber at positive gauge pressure at all times, microwave power producing and delivery means, means for exposing coal to said microwave energy in the second chamber, means to maintain the second chamber at negative gauge pressure at all times, conduit means for passing all of the gases given off by the coal in the second chamber through hot oil containing means, means for regulating the temperature of that oil, means for subsequently selectively freeing gases of specific chemical content from that oil, and condensing means for the differential fractional condensation of said gases.

2. Apparatus as claimed in claim 1 comprising a pipe through which hot oil is caused to flow, means for introducing the gases from the second chamber into that stream of oil, means for breaking that commingled stream of hot oil and gas into finely divided droplets with a maximum of gas/liquid oil interface, and a release in pressure to a predetermined value, means of withdrawing gases liberated selectively from the oil and gas mixture, means of recycling such oil as is not selectively withdrawn, and means of temperature control to maintain the gas/oil stream at a predetermined constant temperature at that point at which selected but commingled gases are liberated from the oil.

3. Apparatus as claimed in claim 2, consisting of a cylindrical condensing chamber, means by which said withdrawn gases are caused to flow past, around, and in close contact with one or more indirect heat exchange surfaces, means to cause said surfaces to rotate within the cylindrical chamber at speeds sufficient to induce centrifugal effects on said surfaces, coolants capable of absorbing heat during indirect heat exchange, a central pipe within the cylindrical chamber supplying said coolants to constricted channels congruent to said indirect heat exchange surfaces, and means to withdraw liquids differentially condensed from the gases.

References Cited

UNITED STATES PATENTS

| | | | |
|---|---|---|---|
| 1,781,659 | 11/1930 | Bartling | 201—19 |
| 2,603,741 | 7/1952 | Seifried et al. | 264—25X |

FOREIGN PATENTS

| | | | |
|---|---|---|---|
| 503,446 | 6/1920 | France | 201—19 |
| 267,358 | 3/1927 | Great Britain | 201—19 |
| 481,456 | 3/1938 | Great Britain | 201—19 |

WILBUR L. BASCOMB JR., Primary Examiner

D. EDWARDS, Assistant Examiner

U.S. Cl. X.R.

202—113, 117, 150; 201—19, 30, 32; 219—10.65